US007610027B2

(12) United States Patent
Alapuranen

(10) Patent No.: US 7,610,027 B2
(45) Date of Patent: Oct. 27, 2009

(54) METHOD AND APPARATUS TO MAINTAIN SPECIFICATION ABSORPTION RATE AT A WIRELESS NODE

(75) Inventor: Pertti Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 1632 days.

(21) Appl. No.: 10/319,567

(22) Filed: Dec. 16, 2002

(65) Prior Publication Data

US 2003/0228875 A1 Dec. 11, 2003

Related U.S. Application Data

(60) Provisional application No. 60/385,563, filed on Jun. 5, 2002.

(51) Int. Cl.
*H04B 1/04* (2006.01)
*H04W 52/30* (2006.01)

(52) U.S. Cl. ...................... 455/117; 455/522
(58) Field of Classification Search ............ 455/522, 455/117
See application file for complete search history.

(56) References Cited

U.S. PATENT DOCUMENTS

| 4,494,192 A | 1/1985 | Lew et al. ................ 364/200 |
| 4,617,656 A | 10/1986 | Kobayashi et al. ........... 370/74 |
| 4,736,371 A | 4/1988 | Tejima et al. ................ 370/95 |
| 4,742,357 A | 5/1988 | Rackley ..................... 342/457 |
| 4,747,130 A | 5/1988 | Ho .......................... 379/269 |
| 4,910,521 A | 3/1990 | Mellon ....................... 342/45 |
| 5,034,961 A | 7/1991 | Adams ....................... 375/130 |
| 5,068,916 A | 11/1991 | Harrison et al. ............... 455/39 |
| 5,231,634 A | 7/1993 | Giles et al. ................ 370/95.1 |
| 5,233,604 A | 8/1993 | Ahmadi et al. ............... 370/60 |
| 5,241,542 A | 8/1993 | Natarajan et al. .......... 370/95.3 |
| 5,317,566 A | 5/1994 | Joshi ......................... 370/60 |
| 5,392,450 A | 2/1995 | Nossen ...................... 455/12.1 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Philip J Sobutka
(74) *Attorney, Agent, or Firm*—Randi L. Karpinia

(57) ABSTRACT

A system and method for medium access control (MAC) protocol which controls transmissions in wireless devices to at least substantially comply with specific absorption rate (SAR) limits. The system and method of MAC protocol uses "source-based" time averaging measurements of transmitter "on-times" and an integral of transmission power to direct transmitter duty-cycle such that SAR limits are met. The system and method monitors and controls topology-dependent functions of a node transceiver, including transceiver duty cycle, transceiver transmit power levels and transceiver power-time products, using a automatic transmission control protocol (ATP) to vary functions to maintain specific absorption rate (SAR) limits for handheld and portable devices which are used close to human bodies. In cases in which SAR limits are approached, the ATP can direct the transceiver at the device to adjust each function, or combination of functions, to maintain an acceptable SAR limit.

19 Claims, 2 Drawing Sheets

U.S. PATENT DOCUMENTS

| | | | |
|---|---|---|---|
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,524,275 A * | 6/1996 | Lindell | 455/117 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,802,445 A * | 9/1998 | Wiedeman et al. | 455/12.1 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,018,646 A * | 1/2000 | Myllymaki et al. | 455/117 X |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,377,782 B1 | 4/2002 | Bishop et al. | |
| 6,424,131 B1 | 7/2002 | Yamamoto et al. | 323/282 |
| 6,477,160 B2 | 11/2002 | Gleeson | |
| 6,597,727 B2 | 7/2003 | Philips et al. | |
| 2001/0053699 A1 | 12/2001 | McCrady et al. | 455/513 |
| 2003/0064761 A1* | 4/2003 | Nevermann | 455/572 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

J.J. Garcia-Luna-Aceves and Ewerton L. Madruga, "The Core-Assisted Mesh Protocol", Aug. 1999, IEEE Journal on Selected Areas in Communications, vol. 17, No. 8.

* cited by examiner

METHOD AND APPARATUS TO MAINTAIN SPECIFICATION ABSORPTION RATE AT A WIRELESS NODE

This application claims benefit under 35 U.S.C. §119(e) from U.S. provisional patent application Ser. No. 60/385,563 entitled "MAC Protocol With Duty-Cycle Limitation For Portable Devices In A Wireless Ad-Hoc Communication Network And A Method For Using The Same", filed Jun. 5, 2002, the entire contents of which is incorporated herein by reference.

BACKGROUND OF THE INVENTION

1. Field of the Invention

The present invention relates to a system and method for providing medium access control (MAC) protocol to direct transmissions in wireless devices such that specific absorption rate (SAR) limits are met. Specifically, the present invention uses "source-based" time averaging measurements of transmitter "on-times" and an integral of transmission power to direct transmitter duty-cycle such that SAR limits are met.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive such data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in it's coverage area.

In recent years, a type of mobile communications network known as an "ad-hoc" network has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and communicate with other mobile nodes, such as those on the public switched telephone network (PSTN), and on other networks, such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

A mobile node may include any number of devices, such as laptop computers or handheld mobile telephones. In the case of many of these devices, concerns regarding electric/magnetic fields have led to the creation of guidelines regarding optimum safe operation. The FCC is required by the National Environmental Policy Act of 1969 to evaluate the effect of emissions from FCC-regulated transmitters on the quality of the human environment. At the present time there is no federally-mandated radio frequency (RF) exposure standard. However, several non-government organizations, such as the American National Standards Institute (ANSI), the Institute of Electrical and Electronics Engineers, Inc. (IEEE), and the National Council on Radiation Protection and Measurements (NCRP) have issued recommendations for human exposure to RF electromagnetic fields. The potential hazards associated with RF electromagnetic fields are discussed in OET Bulletin 56 entitled, "Questions and Answers About the Biological Effects and Potential Hazards of Radiofrequency Electromagnetic Fields", the entire content of which being incorporated herein by reference.

As described in an FCC Bulletin entitled "Evaluating Compliance with FCC Guidelines for Human Exposure to Radiofrequency Electromagnetic Fields", Supplement C to OET Bulletin 65, the entire content of which being incorporated herein by reference, FCC rules require routine environmental evaluation of RF exposure for certain mobile and portable devices. Unless the device is categorically excluded from routine environmental evaluation, applications to the FCC for equipment authorization must include an affirmative statement indicating that the device is in compliance with FCC-adopted limits for RF exposures. In some cases it may be necessary for the applicant to provide certain information to document the test procedures used to evaluate compliance.

Mobile devices that operate at 1.5 GHz or below with an effective radiated power (ERP) of 1.5 watts or more, and those devices that operate at frequencies above 1.5 GHZ with an ERP of 3 watts or more are required to perform routine environmental revaluation for RF exposure prior to equipment authorization or use. Mobile devices may be evaluated with respect to field strength, power density or specific absorption rate (SAR) limits. Devices may be evaluated with respect to SAR limits using either measurement or computational methods.

The Federal Communications Commission (FCC) sets SAR limits for handheld and portable devices which are used close to human bodies and do not pass electric/magnetic field limits due to the close proximity of device antennas to the human body. The FCC rules for evaluating portable devices for RF exposure compliance are described in 47 CFR §2.1093, the entire content of which being incorporated herein by reference. As noted in the FCC Bulletin entitled "Evaluating Compliance with FCC Guidelines for Human Exposure to Radiofrequency Electromagnetic Fields", referenced above, for purposes of RF evaluation, a portable device is defined as a transmitting device designed to be used with any part of it's radiating structure in direct contact with the body of the user or within 20 centimeters of the body of the user under normal operating conditions. This category of devices would include hand-held cellular and PCS telephones that incorporate the radiating antennae into the handpiece and wireless transmitters that are carried next to the body. Portable devices are evaluated with respect to SAR limits for RF exposure. For most portable transmitters used, the applicable SAR limit is 1.6 watts/kg as averaged over any one gram of tissue.

Protection guidelines typically include operating warnings and warning labels for specific operation ranges, as described in an FCC Bulletin entitled "Evaluating Compliance with FCC Guidelines for Human Exposure to Radiofrequency Electromagnetic Fields", Supplement C to OET Bulletin 65, referenced above. When operating and warning instructions are ineffective, the use of warning labels on the transmitting element may also be necessary to caution nearby persons to limit their exposure duration and/or conditions to ensure compliance. If warning labels are not desirable, specific absorption rate evaluations, even when not required, may be used to demonstrate compliance to obviate the need for any warning label that might otherwise be necessary. Additional details of specific absorption rates may be found in 47 CFR 2.1091, and 47 CFR 2.1093, the entire contents of each being incorporated herein by reference.

However, depending on antenna gain and transmission power levels at a device, SAR requirements can typically be difficult with which to comply. Evaluation of mobile devices may be performed with respect to compliance with SAR limits, but it is often simpler and more cost-effective to evaluate compliance with respect to field strength or power density. Accordingly, a need exists for a medium access control (MAC) protocol which directs and controls transmitter operation at a device, in an ad-hoc system with large cell radius, such that SAR requirements are satisfied and demonstrate compliance to obviate the need for any warning label that might otherwise be necessary.

SUMMARY OF THE INVENTION

An object of the present invention is to provide a system and method of MAC protocol which allows handheld and portable device operation with a maximum specific absorption rate (SAR) in any condition.

Another object of the present invention is to provide a system and method to monitor topology-dependent functions of a node transceiver, including transceiver duty cycle, transceiver transmit power levels and transceiver power-time products.

Still another object of the present invention is to provide a system and method to control topology-dependent functions of a node transceiver using a automatic transmission control protocol (ATP) to vary transceiver duty cycle, transmit power levels and transceiver power-time products to maintain specific absorption rate (SAR) limits for handheld and portable devices which are used close to human bodies.

Still another object of the present invention is to provide a system and method to control topology-dependent functions of a node transceiver using an automatic transmission control protocol (ATP) to vary modem data rate and spreading factor to maintain specific absorption rate (SAR) limits for handheld and portable devices.

These and other objects are substantially achieved by a system and method of MAC protocol using measurements of device transmitter "on-times", and an integral of transmission power to direct transmitter duty-cycles, such that SAR limits are met. The transceiver duty cycle, transmit power levels and transceiver power-time products are monitored and, where SAR limits are approached or exceeded, each function can be controlled individually or any combination, by an automatic transmission control protocol. In cases where SAR limits are approached or exceeded, the ATP can direct the transceiver at the device to adjust each function, or combination of functions, to maintain an acceptable SAR value. The ATP can also direct varying modem data rates and spreading factor as an additional function to reduce SAR values to within acceptable levels. Additionally, the system and method can be used prioritized data traffic based on function values detected at each node, thereby eliminating the potential of any single node approaching SAR limits.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
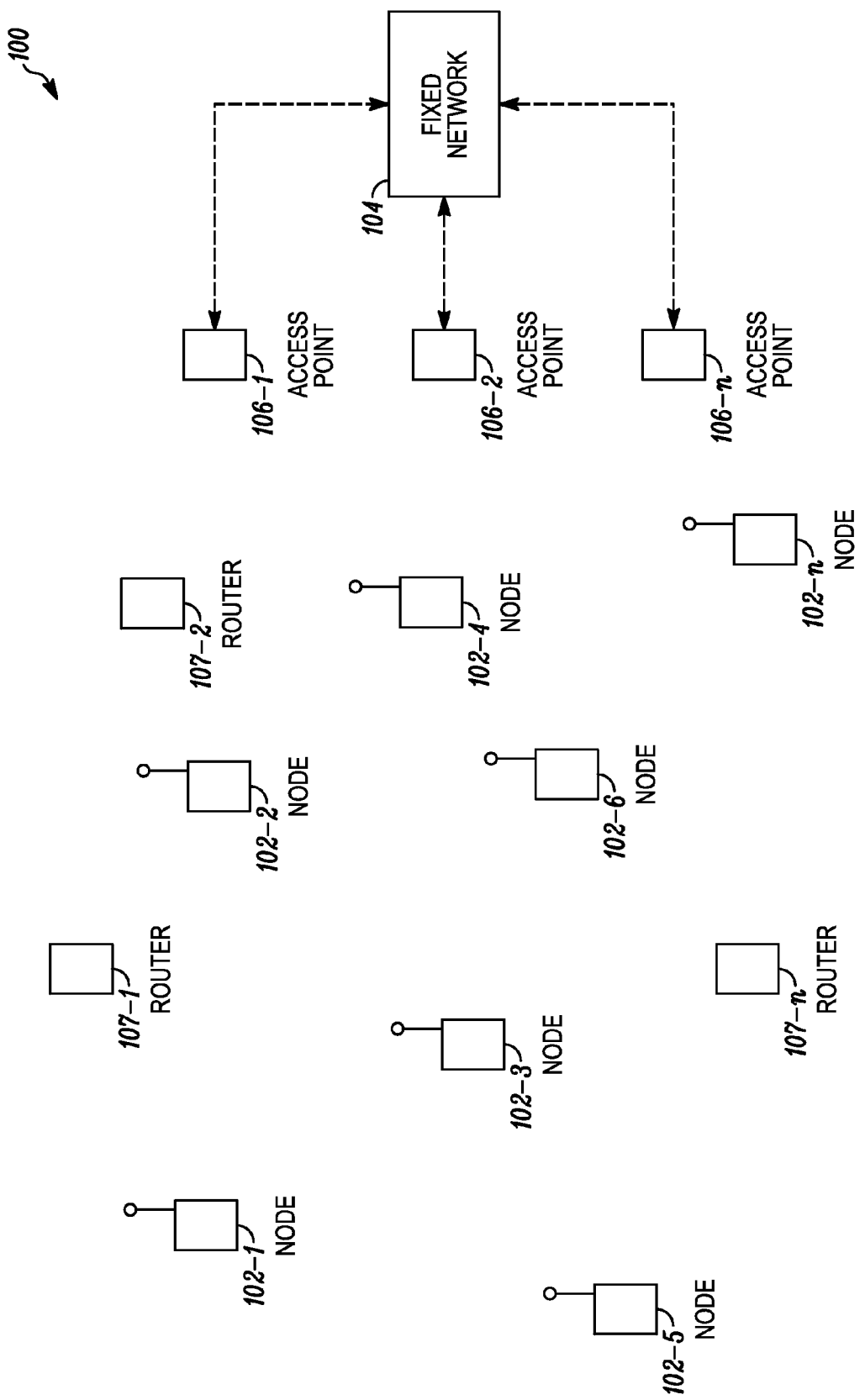
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 can also include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as routers for packets being sent between nodes as described in U.S. Pat. No. 5,943,322 to Mayor, and in U.S. Pat. Nos. 7,072,650, 6,807,165, and 6,873,839, referenced above.

Figure 2:
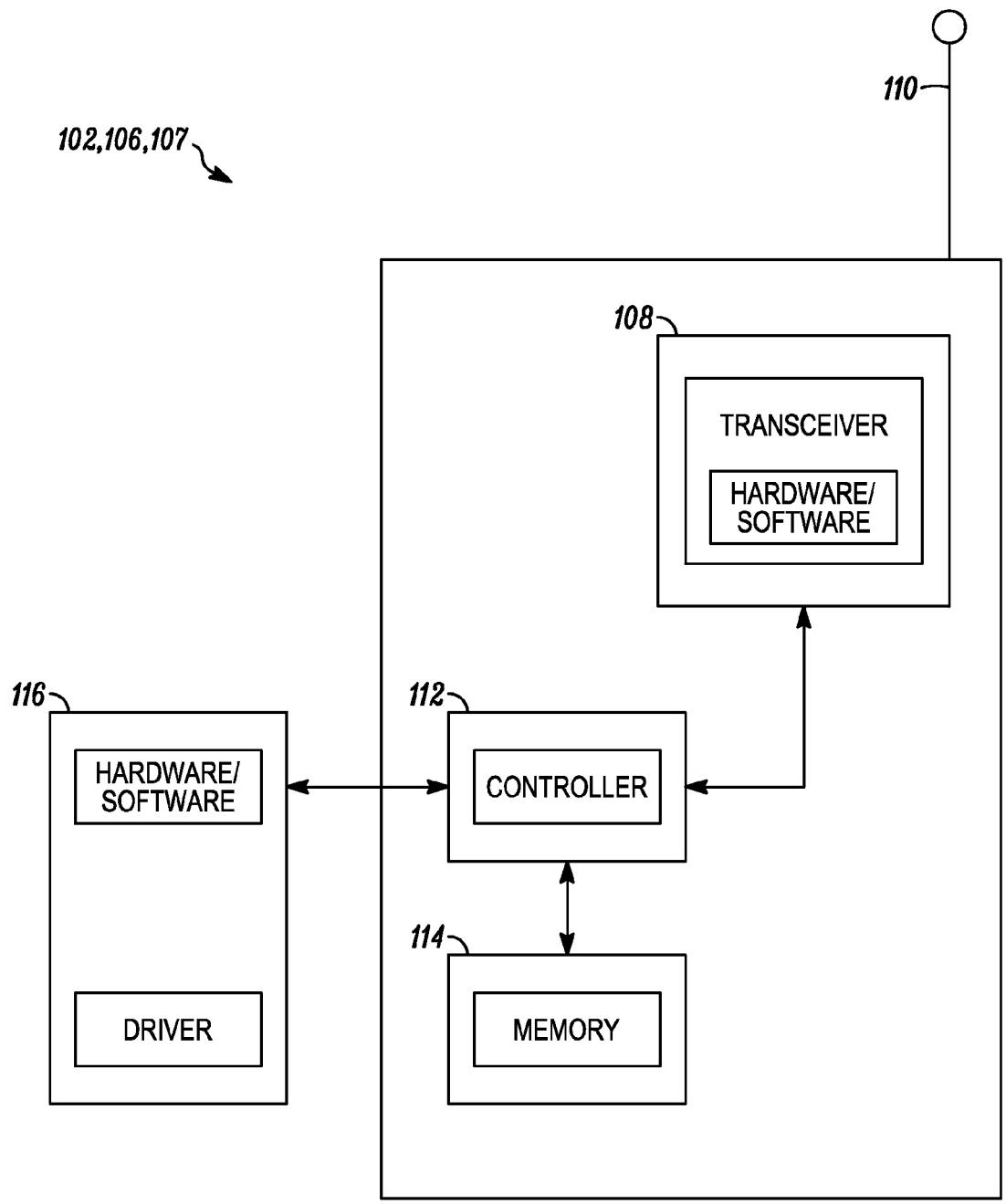
FIG. 2 is a block diagram illustrating an example of a mobile node employed in the network shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. Additionally, the transceiver and controller are capable of monitoring and adjusting transmission power levels and duration as described in greater detail below. The packetized data signals of such transmissions can include, for example, voice, data or multimedia information, and packetized control signals, including node routing and update information.

Each node 102, 106 and 107 further includes a memory 114, such as a random access memory (RAM), that is capable of storing, among other things, routing information pertaining to itself and other nodes in the network 100. The nodes 102, 106 and 107 periodically exchange respective routing information, referred to as routing advertisements or routing table information, with each other via a broadcasting mechanism at various intervals, such as when a new node enters the network, or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform media access control (MAC) protocol, as set forth in greater detail below.

As stated earlier, a mobile node 102 may include any number of devices, such as laptop computers or handheld mobile telephones. In the case of many of these devices, concerns regarding electric/magnetic fields have led to the creation of guidelines regarding optimum safe operation, such as the specific absorption rate (SAR) limits for handheld and portable devices which are used close to human bodies.

In the embodiment of the invention described below, a MAC protocol for duty-cycle limitation at a device is disclosed which, when applied, ensures a device, or mobile node, meets SAR limits. As described in an FCC Bulletin entitled "Evaluating Compliance with FCC Guidelines for Human Exposure to Radiofrequency Electromagnetic Fields", Supplement C to OET Bulletin 65, referenced above, SAR evaluation of low power devices can be achieved with either electric field measurements inside tissue media or computational methods using tissue models. In either case, SAR is determined according to equation (1) below.

$$SAR = \frac{|E|^2 \sigma}{\rho} \quad (1)$$

wherein E is the magnitude of the measured or computed RMS electric field, $\sigma$ is the tissue conductivity and $\rho$ is the tissue mass density. As known to those skilled in the art, SAR is a measure of the rate of energy absorption per unit mass at a specific location in the tissue. SAR may be expressed in units such as watts/kg or milliwatts/gm.

In accordance with an embodiment of the present invention, the MAC protocol uses measurements of transmitter, or transceiver 108, "on-time", and an integral of transmit power over "on-time" of the RF transmitter in a time window that is used to measure SAR. This on-time value and power integral is used to maintain an E value for use in equation (1) that keeps SAR at or below acceptable levels, where E can be determined according to equation (2) below.

$$E = (t_1 - t_0) \times P \quad (2)$$

where $t_1 - t_0$ represents an "on-time" for the transceiver 108 during use, P represents a transmission power level and E represents the product of transmission power over a time interval for use in SAR calculations. The maximum "on-time" is independent on any input data or network condition, and is measured as a power-time product in a sliding window which has the same length or is shorter in time, than the SAR averaging window which is used for measuring SAR.

In a first embodiment of the present invention, depending on the integrated power over some predetermined window, the MAC protocol allows automatic transmission control protocol (ATP) to increase or decrease transmission power level P to maintain SAR at or below acceptable levels. The functions of the ATP include calculating the appropriate power level for unicast and broadcast transmissions. The library of functions comprising the ATP keeps track of the local neighbor nodes and required power levels, and provides this information to the logical link control when called.

If communication is not possible within a predetermined maximum integrated product of time and power without exceeding maximum limit, then transceiver duty-cycle is reduced. In this case, duty-cycle is defined as the fraction or percent of time per interval that the transceiver 108 is transmitting, and can be determined according to equation (3) below.

$$\frac{\text{(total on-time)} - \text{(total off-time)}}{\text{total on-time}} \quad (3)$$

In such an application, MAC protocol allows device operation with guaranteed maximum SAR in any condition. Such operation may be useful for radios that need to transmit high power in emergency, law enforcement and firemen applications.

In a second embodiment of the present invention, the MAC protocol allows automatic transmission control protocol (ATP) to increase or decrease duty cycle $t_1 - t_0$. In accordance with a second embodiment of the present invention, "source-based" time-averaging based on an inherent property or transceiver duty cycle of a node is allowed to reduce SAR according to FCC rules. As stated in FCC OET Bulletin 64, for purposes of determining radio frequency (RF) exposure, the transmission protocols used by certain spread spectrum transmitters may qualify the device for source-based time averaging. The applicable duty factor may be determined according to the RF output power "on" and "off" time duration, either as a signal with a repeatable duty cycle, or by establishing a worst case duty factor using power off duration identified by the transmission protocol. Duty factors related to device usage, frequency hopping or other similar transmission conditions are normally not acceptable as source-based, time averaging factors for RF evaluations.

Additional details of source-based time averaging and specific absorption rates may be found in 47 CFR 2.1091, referenced above. Specifically, current FCC rules state time-averaging provisions may not be used in determining typical exposure levels for devices intended for use by consumers in general population/uncontrolled environments. However, "source-based" time averaging based on an inherent property or duty-cycle of a device is allowed. An example of this is the determination of exposure from a device that uses digital technology such as a time-division multiple-access (TDMA) scheme for transmission of a signal. In general, maximum average power levels must be used to determine SAR compliance. The second embodiment of the present invention presented here uses a MAC protocol which is adapted to control the duty cycle of the RF transceiver and guarantee that maximum transceiver "on-time", that is $t_1 - t_0$ as shown in equation (2), is not exceeded in a predetermined period to maintain SAR at or below acceptable levels.

The embodiment includes an adaptive transmission protocol (ATP) as part of the MAC protocol which may be used to adjust any combination of RF transmit power, duty-cycle and other factors. The RF transceiver 108 can be turned "off" and/or transmit power can be reduced if maximum power-time product in a time window is going to be exceeded. This may cause problems in the network but will serve to guarantee SAR limits are not exceeded and can be used to guarantee conformity for type approval.

In a third embodiment of the present invention, the ATP may be used to adapt modem data rate and spreading factor depending on how much power-time product over integration period is below the maximum limit. The ATP can lower the data rate while maintaining the link when the power-time product in a window is otherwise going to be exceeded. To achieve this, the embodiment increases the spreading factor and lowers RF power. The information of power-time product can be used by MAC protocol in prioritizing traffic.

The embodiment described above may be used to "back-off" transmissions in time if duty-cycle limit is otherwise exceeded. Also, contention resolution back off can be a function of power-time product in a time window. The embodiment also uses ATP to adjust data rate and transmission power based on integrated transmit energy (SAR) in a time window. Logic may be included at each node to switch the RF transmitter 108 off if the integrated energy (SAR) limit is otherwise exceeded. In this case, integrated energy is integrated over window that contains transmitted energy in any window position over selected integrated period.

The embodiment may also inform higher layers of limitations in power-time product over some time window. This can be used to avoid other nodes routing through the device if in handheld mode. Also, the embodiment may have a different limit depending on operation mode. For example, the same device when connected to a vehicle cradle may have a higher power-time limit than a device used as a handheld. The MAC protocol of the present embodiment therefore allows MAC protocol to operate differently when located in a cradle and hence not in handheld mode. Finally, the embodiment allows higher power hand portable devices to be type approved as SAR limits are guaranteed.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for operation of a wireless node to maintain a specific absorption rate (SAR) level when communicating within a communications network, the method comprising:
   comparing a current specific absorption rate with a maximum specific absorption rate level;
   when the current specific absorption rate is greater than the maximum specific absorption rate level, adjusting at least one topology-dependent function to modify the current specific absorption rate to meet the maximum specific absorption rate level; and
   wherein the topology-dependent function comprises a power-time product, the method further comprising:
   prioritizing data traffic between the node and one or more other nodes of said network based on said power-time product of the node.

2. A method as claimed in claim 1, wherein the topology-dependent function comprises a duty cycle of a transceiver of the node, wherein the duty cycle comprises a percentage of time the transceiver is transmitting during a time interval and further wherein the adjusting comprises reducing the duty cycle.

3. A method as claimed in claim 2, wherein the adjusting step further comprises:
   using source-based time averaging to adjust the duty cycle.

4. A method as claimed in claim 1, wherein the topology-dependent function comprises an average transmit power level of a transceiver of the node during a time interval, and further wherein the adjusting comprises adjusting the transmit power level.

5. A method as claimed in claim 4, further comprising:
   measuring a transmit power over an "on time" of the transceiver of the node; and
   wherein the adjusting further comprises adjusting the transmit power "on time".

6. A method as claimed in claim 4, further comprising:
   calculating an acceptable power level for each of a unicast and a broadcast transmission; and
   wherein the adjusting step includes adjusting the transmit power level within the acceptable power levels while meeting the maximum specific absorption rate.

7. A method as claimed in claim 1, wherein the adjusting comprises adjusting the power-time product to adjust a total transmit power per a time interval of a transceiver of the node.

8. A method as claimed in claim 7, further comprising:
   comparing the power-time product over the time period to a maximum power-time product limit; and adjusting at least one of a modem data rate and spreading factor at the node when the power-time product exceeds the maximum power-time product limit.

9. A method as claimed in claim 8, further comprising:
   adjusting at least one of a spreading factor and a radio frequency power to meet the maximum specific absorption rate.

10. A method as claimed in claim 1, wherein the adjusting comprises adjusting the at least one topology-dependent functions via an adaptive transmission protocol of a media access control.

11. A wireless node operating within a communications network, the node comprising:
   a controller for:
      comparing a current specific absorption rate with a maximum specific absorption rate level,
      when the current specific absorption rate is greater than the maximum specific absorption rate, adjusting at least one topology-dependent to modify the current specific absorption rate to meet the maximum specific absorption rate level, and
   wherein the topology-dependent function comprises a power-time product, prioritizing data traffic between the node and one or more other nodes of said network based on said power-time product of the node.

12. A node as claimed in claim 11, further comprising:
   a transceiver coupled to the controller, wherein the transceiver operates using a duty cycle comprising a percentage of time the transceiver is transmitting during a time interval,
   wherein the topology-dependent function comprises the duty cycle of the transceiver.

13. A node as claimed in claim 12, wherein:
   the controller uses source-based time averaging to adjust the duty cycle.

14. A node as claimed in claim 11, further comprising:

a transceiver coupled to the controller, wherein the transceiver operates using an average transmit power level during a time interval, wherein the topology-dependent function comprises a current transmit power level.

15. A node as claimed in claim 14, wherein:

the controller measures a transmit power-over an "on time" of the transceiver and wherein the topology-dependent function comprises the transmit power "on time".

16. A node as claimed in claim 14, wherein:

the controller further:

calculates an acceptable power level for each of a unicast and a broadcast transmission, and wherein the controller adjusts the transmit power level within the acceptable power levels while meeting the maximum specific absorption rate.

17. A node as claimed in claim 11, wherein:

the controller further:

compares the power-time product over the time period to a maximum power-time product limit, and adjusts at least one of a modem data rate and spreading factor of the node when the power-time product exceeds the maximum power-time product limit.

18. A node as claimed in claim 17, wherein:

the controller adjusts at least one of a modem data rate and spreading factor at said at least one node by increasing said spreading factor and lowering said transmission power at a transceiver at said at least one node.

19. A node as claimed in claim 11, wherein said controller adjusts said at least one topology-dependent function via an adaptive transmission protocol of a media access control.

\* \* \* \* \*

UNITED STATES PATENT AND TRADEMARK OFFICE
CERTIFICATE OF CORRECTION

PATENT NO. : 7,610,027 B2 Page 1 of 1
APPLICATION NO. : 10/319567
DATED : October 27, 2009
INVENTOR(S) : Alapuranen It is certified that error appears in the above-identified patent and that said Letters Patent is hereby corrected as shown below:

IN THE SPECIFICATION

1. In Column 2, Line 44, delete "revaluation" and insert -- evaluation --, therefor.

Signed and Sealed this

Seventeenth Day of August, 2010

David J. Kappos
*Director of the United States Patent and Trademark Office*